June 16, 1959     K. F. RENTSCHLER     2,890,638
CAMERAS
Filed March 26, 1954     3 Sheets-Sheet 1
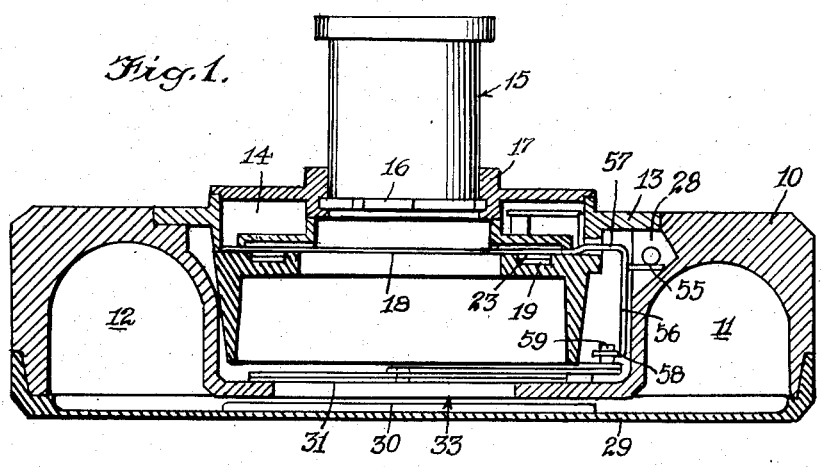
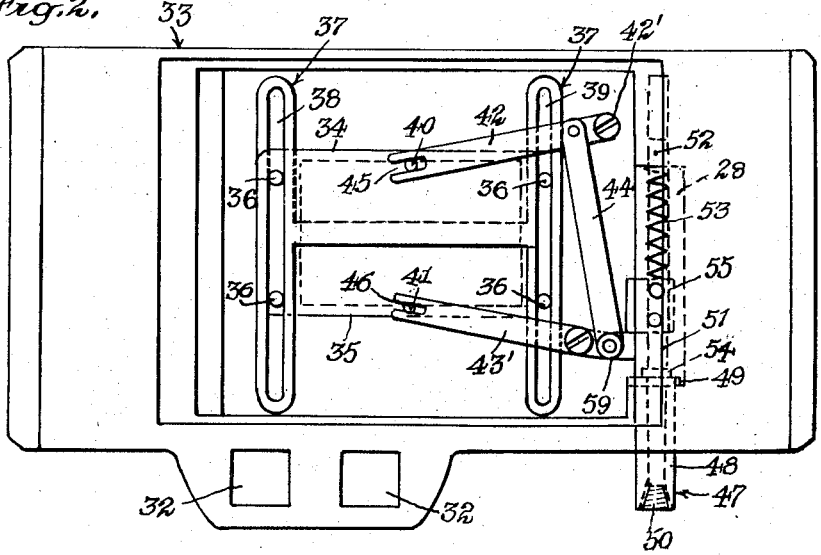
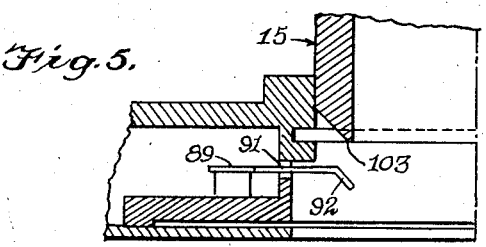
INVENTOR
Karl F. Rentschler
BY Sylvester J. Liddy &
Arthur L. Nathanson
ATTORNEYS INVENTOR
Karl F. Rentschler
BY
ATTORNEYS June 16, 1959 K. F. RENTSCHLER 2,890,638
CAMERAS
Filed March 26, 1954 3 Sheets-Sheet 3

INVENTOR
Karl F. Rentschler
BY Sylvester J. Liddy +
Arthur F. Nathanson
ATTORNEYS United States Patent Office 2,890,638
Patented June 16, 1959

2,890,638

CAMERAS

Karl F. Rentschler, Calmbach (Enz), Germany, assignor to Alfred Gauthier G.m.b.H., Calmbach (Enz), Germany, a corporation of Germany Application March 26, 1954, Serial No. 418,909

Claims priority, application Germany March 26, 1953

7 Claims. (Cl. 95—39)

This invention relates to cameras and more particularly to cameras having lens shutters and movable lens assemblies.

There has been an increasing use of lens shutters on cameras, especially those cameras of the type known as miniature cameras and the like. As is well known, lens shutters in these cameras are located near the front wall of the camera housing directly to the rear of the lens assembly, rather than adjacent to the rear wall of the camera housing as is the case with focal plane shutters. Therefore, with the use of lens shutters, it was not possible to move the lens assembly into the camera housing while the camera was not in use and even with miniature cameras, a relatively large space consuming camera having a lens assembly projecting therefrom is of necessity utilized in order to obtain the advantageous features of the lens shutters. This bulk detracted from the camera's appearance, was disadvantageous when carrying the same and deprived it of the advantages of compactness.

In attempting to overcome this problem, it has been proposed that the lens shutters in such cameras be opened to permit the entry of a movable lens assembly into the camera housing without exposing the film itself. However, in the construction heretofore provided, this action could take place only when the speed setting ring of the shutter was set in time exposure position, and when the shutter was set in cocked position. This construction proves disadvantageous in that it necessitates the adjustment of the camera to a certain setting and maintaining that setting while moving the lens assembly into the camera housing. Also, it is necessary to keep the shutter in cocked position while so moving the lens assembly.

An object of the present invention is to provide a camera having a lens shutter and a movable lens assembly in which the lens assembly may be urged into the camera housing at any speed setting of the shutter.

Another object of the present invention is to provide a camera having a lens shutter and a movable lens assembly in which the lens assembly may be urged into the camera housing whether the shutter is in cocked or uncocked position.

A feature of the present invention is the provision of easily operable means whereby the lens shutter may be opened to permit the entry of the lens assembly into the camera housing.

Another feature of the present invention is the provision of means providing absolute light density when the lens shutter is open to permit the entry of the lens assembly into the camera housing.

Still another feature of the present invention is the provision of means in a camera accomplishing all the desired features which is, nevertheless, not expensive to the manufacturer and relatively simple to construct.

Other features and advantages are set forth in the accompanying specification taken in conjunction with the accompanying drawings, in which:

Fig. 1 is a top view, partly in section, of the camera of present invention.

Fig. 2 is a plan view of a focal plane shutter used in the camera of the present invention.

Fig. 5 is a side view, partly in section, of the shutter opening of the modified form of the present invention shown in Fig. 4.

Figure 3:
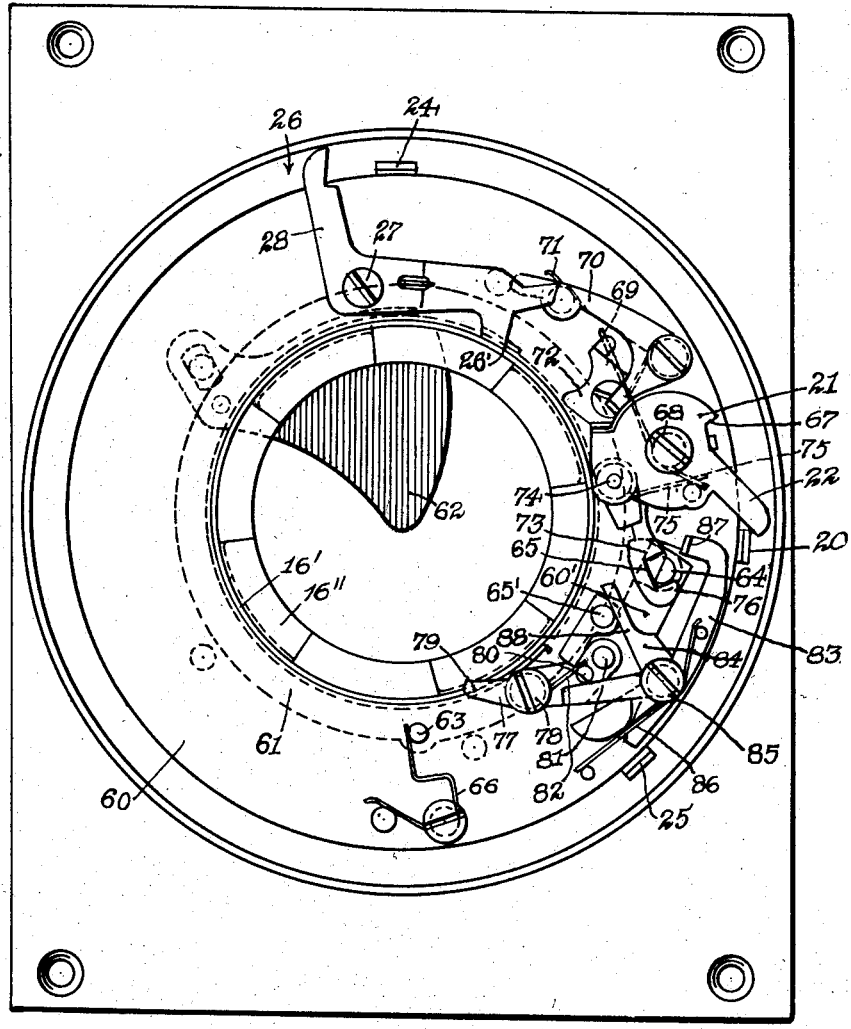
Fig. 3 is a plan view of the lens shutter of the present invention in idle position.

Referring to the drawings and more particularly Fig. 1 thereof, there is shown a camera housing 10 having recesses 11 and 12 for holding the film cartridge and winding spool, respectively. A special housing 13 having a lens shutter 14 is secured within the camera housing 10. A lens assembly 15 is movably mounted by means of a bayonet lock 16 in a cap 17.

The cap is secured to the special housing 13 by means of cooperating threads or any other suitable fastening means. A cover plate 18 is provided for delineation purposes between the lens shutter 14 and the special housing 13.

Broadly, the means for locking and releasing the shutter are as follows: The cocking ring 19 having a bent off arm 20 is provided in the special housing 13. A spring housing 21 having an arm 22 is located in the path of movement of the bent off arm 20. When the cocking ring 19 is turned counterclockwise, the spring housing 21 is also urged in a counterclockwise direction to cocking position by the engagement of the arm 22 of the spring housing 21 with the bent-off arm 20 of the cocking ring. For releasing the shutter a ring 23 having a bent-off arm 24 and a lug 25 is secured in the special housing 13. A release lever 26 having an offset lug 26' is pivotally secured around a shaft 27 with one of the arms 28 of the lever 26 disposed in the path of movement of the bent-off arm 24 of the ring 23. Thus, when the ring 23 is turned in a counterclockwise direction, the engagement of the bent-off arm 24 with the arm 28 of the lever 26 actuates the opening of the shutter blades by means hereinafter described.

The camera housing 10 itself is provided with a back wall 29. A film pressure plate 30 is secured to the back wall 29 of the camera housing. Picture size limiting means 31 and view finder openings 32 are also provided in the camera as shown in Figs. 1 and 2.

As shown in detail in Fig. 2 a focal plane shutter 33 is provided to the rear of the camera housing 10. The focal plane shutter 33 consists of vertically movable shutter blades 34 and 35. The shutters 34 and 35 are provided with pins 36. Guide members 37 having slots 38 and 39 are provided at each extremity of the shutter blades 34 and 35. The pins 36 ride in the slots 38 and 39 which thus act as a guide and stop for the vertical movement of the shutter blades. Shutter blades are also provided with pins 40 and 41, as shown in Fig. 2. Levers 42 and 43 connected by a rod 44 and each having a crotch portion 45 and 46 respectively are pivotally secured around the shafts 42' and 43'. The crotch portions 45 and 46 respectively engage the pins 40 and 41 and the shutter blades 34 and 35 whereby movement of the levers will cause vertical movement of the shutter blades. The movement of the shutter blades in this fashion is actuated by the camera release 47. As shown in Fig. 2, the camera release consists of a bushing 48 having a shoulder 49 and a cable release socket 50. Another bushing 51 is guided in the bushing 48 and is movable with the pin 52 against the urging of a spring 53. The bushing 51 is provided with a shoulder 54 engaged by the shoulder 49 of the bushing 48. The bushing 49 is also provided with a special flange 55 having an arm 56, which arm is provided with rectangularly bent-off fingers 57 and 58. The finger 57 is engaged by the ring 23 whereby movement of the finger 57 actuates this ring 23. The arm 58 is engaged by a pin 59 in the lever 43, as shown in Figs. 1 and 2, whereby movement of the arm 58 actuates the vertical movement of the focal plane shutter 33. Extended undesired movement of the spring 53 is prevented by its contact with the end of the recess 28 in the camera housing 10. The adjustment of the releasing means set forth is such that the focal plane shutter 33 is fully opened by the camera release before the lens shutter 14 is released and opened.

The details of the lens shutter 14 of the camera of the present invention are shown in Fig. 3. A base plate 60 having a recess 60' is secured to the special housing 13. A blade ring 61 connected with a shutter blade 62, only one of which is shown for the purposes of clarity, is rotatably secured to the base plate 60. The blade ring 61 is provided with a pin 63 and an arm 64 having a pin 65 which is semi-circular in cross-section near the extremity thereof extending through the recess 60'. Another pin 65' is also provided on the blade ring 61 for the purposes hereinafter set forth. A spring 66 engages the pin 63 for normally maintaining the shutter blade in closed position. The spring housing 21 having a shoulder 67 is pivotally secured to the base plate 60 around a shaft 68. A drive spring 69 engages the spring housing and is under tension when the lens shutter is in set position. The locking lever 70 influenced by the spring 71 is pivotally mounted on the base plate 60. One arm of the locking lever 70 abuts the shoulder 67 of the spring housing 21 when the lens shutter is in set position. The other arm of the locking lever 70 is in the path of movement of the lug 26' of the release lever 26. The other arm of the release lever 26 is, as aforesaid, disposed in the path of movement of the bent-off arm 24 of the ring 23. A stop plate 72 having one extremity engaging the drive spring 69 is secured to the base plate 60, preventing movement of the drive spring 69 and the spring housing 21 beyond a predetermined position when the shutter is released. An action pawl 73 is pivotally secured around a shaft 74 under the influence of a spring 75 to the spring housing 21. The action pawl 73 is provided with a notch 76 which engages the semi-circular pin 65 on the arm 64 of the blade ring 61. In operation, pressure applied to the release lever 26 causes the offset lug 26' to move the locking lever 70 out of engagement with the shoulder 67 of the spring housing 21. The spring housing turns in a clockwise direction moving the action pawl 73 in the same direction. This movement causes the blade ring 61 to move in a clockwise direction by means of the engagement of the notch 76 with the pin 65 on the arm 64 of the blade ring 61. When the pin 65 meets the end of the recess 60', clockwise movement of the blade ring is stopped. After a further small angular way of the spring housing 21 the action pawl 73 reaches such a position in order to influence the pin 65 again and to cause a movement of the shutter blade ring 61 in counterclockwise direction; by this the shutter is closed in a well known manner. After closing the shutter, the spring housing 21 is stopped by the stop plate 72.

The shutter is then in the position shown in Fig. 3. The device may then be reset to set position by counterclockwise movement of the cocking ring 19 whose bent-off arm 20 engages the arm 22 on the spring housing 21 urging it to set position.

By the arrangement disclosed the focal plane shutter and the lens shutter are opened by the same action of the camera release. When pressure is applied to the release, a movement of the flange 55 causes movement of the connecting arm 56, which in turn moves the bent-off arms 57 and 58. As above described, the bent-off arm 58 engaging the pin 59 causes the focal plane shutter to move vertically. When the focal plane shutter is fully opened, the engagement of the bent-off arm 57 with the bent-off arm 24 on the ring 23 causes the ring to turn in a counterclockwise direction to actuate the opening of the lens shutter by its engagement with the release lever 26 with the operation opening the lens shutter taking place in the fashion described hereinabove.

According to the present invention there is provided new and novel means for opening the shutter blades 62 of the lens shutter independently and apart from the opening of the shutter blades described above for taking a picture. This opening permits the entry of the lens assembly into the camera housing so that that it is virtually completely contained therein without at all exposing the film. The construction is such that the lens assembly may enter the camera housing as aforesaid at any shutter speed setting and whether the shutter is in cocked position as described hereinabove, or in uncocked position as shown in Fig. 3. For this purpose, according to the present invention, there is provided a special device consisting of a lever 77 pivotally secured around a shaft 78 and having an arm 79. The lever 77 is also provided with two pins 80 and 81 on the end of the lever opposite the arm 79. A spring 82 engages the lever 77 normally urging it in a clockwise direction. There is also provided in proximity to the lever 77, two levers 83 and 84, each pivotally mounted on a shaft 85. The lever 83 is provided with an arm 86, as shown, and with an offset lug 87 at the extremity opposite said arm. The offset lug 87 is normally disposed adjacent the latch 73. The pin 65' is normally disposed adjacent one arm 88 of the lever 84. It is to be noted that the parts 16' of the bayonet lock are in engagement with the counter members 16" in the cover cap when the lens assembly is in exposure taking position. In this position the arm 79 of the lever 77 engages the part 16' of the bayonet lock in the counter member 16" maintaining the special device in inoperative position. In this position pictures may be taken. In order to open the shutter blades independently to provide for the entry of the lens assembly into the camera housing, the lens assembly 15 is turned in a counterclockwise direction. The part 16' of the bayonet lock is moved out of engagement with the counter member 16" of the cover cap, releasing the arm 79 of the lever 77, which, under the influence of the spring 82, moves in a clockwise direction. The lever 83 is engaged by the pin 80 and is caused to move in a counterclockwise direction. This action in turn causes the offset lug 87 to engage the action pawl 73 and urge it out of its engagement with the semicircular pin 65. Thereafter the pin 81 engages the lever 84 causing it to turn in a counterclockwise direction. This movement in turn causes the arm 88 of the lever 84 to engage the pin 65' on the blade ring 61, causing the pin 65' carrying the blade ring to be moved in a counterclockwise direction and opening the shutter blades during this turning movement.

The movement of the lever 83, as aforesaid, causes its arm 86 to be turned in a counterclockwise direction into the path of movement of the lug 25 on the ring 23. In this position with the bayonet lock 16 open, the lens assembly may be shifted into the camera housing with the shutter blades open as aforesaid. As described, the arm 86 of the lever 83 is in this position in the path of movement of the lug 25 of the ring 23, which effects a locking of the ring preventing further movement and also locking the camera release 47 for the reason that the ring 23 follows the movement of the release 47 and the release cannot be moved when the ring is locked.

By the locking set forth above, it is impossible to expose the film because it is impossible to actuate the camera release 47 when the lens assembly is disposed in the inwardly shifted, storage position in the housing no matter whether the shutter is in cocked or uncocked position. It is to be noted that the film is not exposed for there has been no actuation of the focal plane shutter and thus no light enters against the film due to the covering provided by the focal plane shutter during the operation permitting the lens assembly to enter the camera housing.

Figure 4:
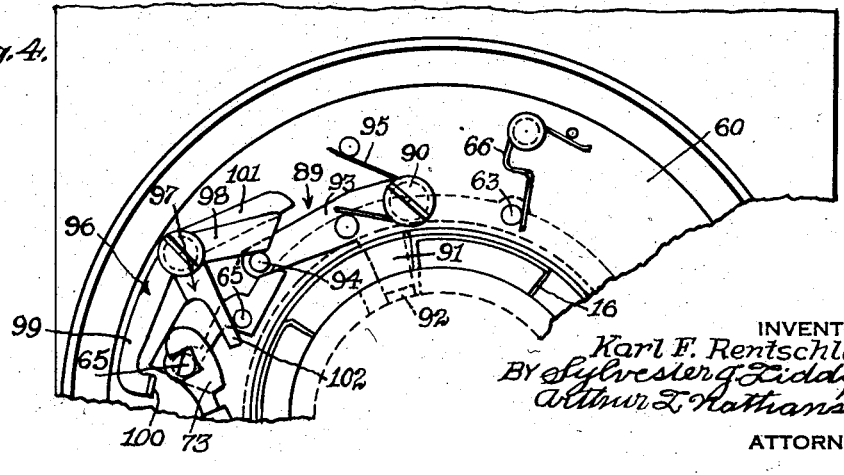
Fig. 4 is a fragmentary plan view of a modified form of the present invention.

In Figs. 4 and 5 a modification of the present invention is disclosed. In this embodiment the focal plane shutter and the lens shutter are of similar construction to that shown in Figs. 1-3 hereinbefore described and corresponding parts are referred to by the reference characters wherever possible. For opening the lens shutter independently without exposing the film to permit the entry of the lens assembly into the camera housing, a lever 89 is provided which is pivotally secured to the base plate 60 around a shaft 90. One arm 91 of the lever 89 is provided with an angularly offset lug 92. The other arm 93 is provided with a pin 94. A spring 95 engages the lever 89 and normally urges it in a counterclockwise direction, as shown in Fig. 5. A lever 96 and another lever 97 are also pivotally secured to the base plate 60 on top of each other. One arm 98 of the lever 96 is normally located adjacent the pin 94 on the lever 89, while the other arm 99 is provided with an offset lug 100 normally located adjacent the latch 73. An arm 101 of the lever 97 is normally located slightly away from the pin 94 and substantially underneath the arm 98 of the lever 96. The other arm 102 of the lever 97 is normally located adjacent the pin 65' on the blade ring 61.

In this form of the present invention a lens assembly 15 is provided with a truncated end 103 adapted to engage the angularly offset lug 92 of the lever 89. When the lens assembly 15 is in exposure taking position, the arm 91 of the lever 89 extends slightly into the opening below the lens assembly in the camera housing without interfering with the taking of exposures in any way. When it is desired to urge the lens assembly into the camera housing in any position of the speed setting ring, whether the shutter is in cocked or uncocked position, the bayonet lock 16 is loosened and the lens assembly is moved axially into the camera housing. The initial movement of the lens assembly in this direction causes the truncated end 103 of the lens assembly to engage the offset lug 92 on the arm 91 of the lever 89. The offset lug 92 is urged outwardly causing clockwise movement of the lever 89. The pin 94 on the arm 93 of the lever 89 engages the arm 98 of the lever 96 and urges the lever 96 to move in a counterclockwise direction. This movement causes the offset lug 100 on the other arm 99 of the lever 96 to engage the action pawl and urge it to release the semi-circular pin 65. Thereafter the pin 94 on the lever 89 engages the arm 101 of the lever 97 and urges the lever 97 to turn in a counterclockwise direction. This movement in turn causes the other arm 102 of the lever 97 to engage the pin 65' on the blade ring 61 and urges the blade ring to turn in a counterclockwise direction whereby the shutter blades are opened.

It is to be noted that the opening of the shutter blades to permit the entry of the lens assembly into the camera housing is accomplished before the base of the lens assembly reaches the plane of the shutter blades.

Figure 6:
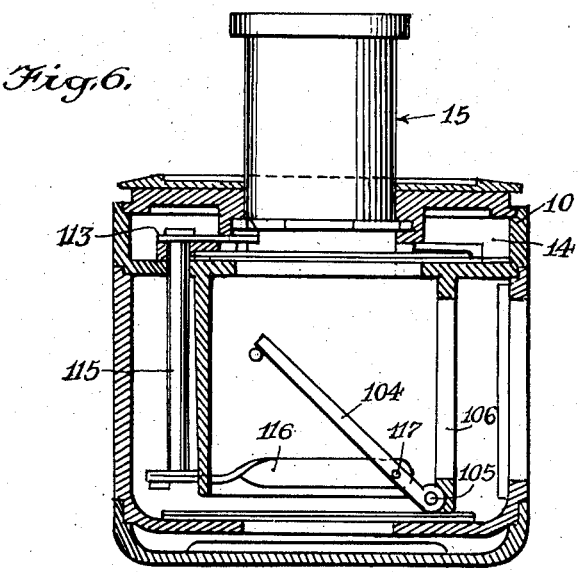
Fig. 6 is a side view of another modified form of the present invention adapted to be used in a single lens reflex camera.
Figure 7:
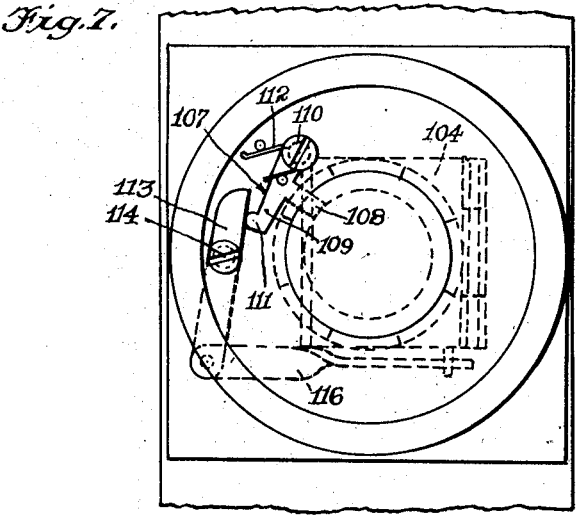
Fig. 7 is a top view of the shutter opening means of the modified form of the present invention shown in Fig. 6.

In Figs. 6 and 7 another modified form of the present invention is shown which is particularly adapted for use in a single lens reflex camera having a lens shutter. With this construction also parts corresponding to those described hereinabove have been given, wherever possible, the same reference characters. As shown in Fig. 6, the lens assembly 15 is in exposure taking position. The lens shutter 14 is located in the camera housing 10 in the same position described hereinabove. A mirror 104 pivotally secured about a shaft 105 to a ground glass 106 is disposed within the housing 10 of the single reflex camera. The mirror is movable out of the path of the light rays immediately before taking an exposure by any well-known means. In order to enable the lens assembly 15 to enter the camera housing 10 upon independent movement of the shutter blades 14 and independent movement of the mirror out of the path of the lens assembly and without taking an exposure, a modified form of the present invention is provided. In this embodiment a lever 107 comprising arms 108 and 109 is pivotally mounted on a shaft 110 to the base plate 60. The arm 109 has a projecting portion 111. A spring 112 normally urges the lever 107 in a counterclockwise direction. An arm 108 of the lever 107 has an angularly offset end at the extremity which extends slightly into the opening in the camera housing below the lens assembly 15. A lever 113 is pivotally mounted on the base plate 60 around the shaft 114. One end of the lever 113 is normally located adjacent the projecting portion 111 of the arm 109. The other end of the lever 113 is secured to one end of a connection rod 115 whose other end is secured to one end of a twisted plate 116. The other end of the twisted plate 116 is secured by means of a shaft 117 to the lower portion of the mirror 104, as shown in Figs. 6 and 7. The lens assembly 15 is provided with a truncated end 103 adapted to engage the angularly offset end of the arm 108.

In the operation of this form of the present invention, the bayonet lock of the lens assembly is loosened and the lens assembly is axially moved into the camera housing. The initial movement of the lens assembly in this direction causes the truncated end 103 of the lens assembly to engage the angularly offset end of the arm 108 and urges it outwardly causing the intra lens shutter to open as described with reference to the modification shown in Figs. 4 and 5. The movement of the arm 108 also causes a counterclockwise movement of the lever 107. The projection 111 engages the lever 113 urging the lever to pivot about the shaft 114 in a counterclockwise direction. By means of the connection through the connecting rod, the aforesaid movement of the lever 113 causes the twisted plate 116 to move horizontally which in turn urges the mirror 104 upwardly against the ground glass 106.

By this construction the opening of the shutter blades is accomplished before the lens assembly reaches the plane of the shutter blades and the movement of the mirror takes place before the lens assembly reaches that portion of the camera housing. As in other forms of the present invention, the film is prevented from being exposed by the focal plane shutter which has remained in place. It will be understood that the movement of the lens assembly described in connection with the foregoing is a different position as that which takes place in a focusing operation.

By the structure provided in all forms of the present invention, it is possible, as described, to move the lens assembly into the camera housing in cameras having lens shutters with the same ease with which they are moved into the housing of cameras with focal plane shutters. It is to be noted that all impediments to the movement of the lens assembly into the camera housing are removed prior to the lens assembly reaching the plane of the impediments and this action takes place at every shutter speed setting of the lens shutter and in cocked or uncocked position of the same.

While the invention has been described in detail above, it is to be understood that variations and modifications may be made without departing from the spirit of the invention or the scope of the appended claims.

I claim:

1. A camera having at least one reversibly movable shutter; means including a spring charged member for actuating said shutter, said means further including a disconnectable driving connection between the spring charged member and shutter, said connection being disengageable in either cocked or uncocked position of said spring charged member; a lens assembly mounted in front of said shutter, said assembly being retractively movable axially in the direction of said shutter and past the same; means responsive to retracting movement of the lens assembly for disengaging the said disconnectable driving connection to enable the shutter to move independently of the spring charged member; and means actuated by further retracting movement of the lens assembly for shifting said shutter to provide clearance for said lens assembly.

2. The camera of claim 1 including an element adapted to effect operation of the last two mentioned means, said element having biasing means biasing said element to an inoperative position, said element having a portion engageable to effect operation thereof and operation of said last two mentioned means, the latter portion being engageable by said lens assembly during said retracting movements to effect operation of both said last two mentioned means.

3. A camera having at least one reversibly movable shutter; means including a spring charged member for actuating said shutter, said means further including a disconnectable driving connection between the spring charged member and shutter, said connection being disengageable in either cocked or uncocked position of said spring charged member; a lens assembly mounted in front of said shutter, said assembly being retractively movable axially in the direction of said shutter and past the same; means responsive to retracting movement of the lens assembly for disengaging the said disconnectable driving connection to enable the shutter to move independently of the spring charged member; and means actuated by further retracting movement of the lens assembly for shifting said shutter to provide clearance for said lens assembly at any speed setting of said shutter.

4. A camera having at least one reversibly movable shutter; means including a spring charged member for actuating said shutter, said means further including a disconnectable driving connection between the spring charged member and shutter, said connection being disengageable in either cocked or uncocked position of said spring charged member; a lens assembly mounted in front of said shutter, said assembly being retractively movable axially in the direction of said shutter and past the same; means responsive to retracting movement of the lens assembly for disengaging the said disconnectable driving connection to enable the shutter to move independently of the spring charged member; and means actuated by turning movement of the lens assembly for opening the shutter after it has been freed for movement thereby to provide clearance for said lens assembly.

5. In a camera, a shutter operable to open and closed positions, a lens assembly, said assembly being movable from a first position in front of said shutter to a second position wherein said lens assembly extends through said shutter, said shutter normally being closed, means for opening said shutter for movement of said lens assembly into said second position comprising an operating member connected to said shutter, a lever, said lever being movable in operative abutting connection with said shutter operating member and having a normal inoperative position, said lever being movable to open said shutter, means biasing said lever to open said shutter, said lever being in bias restraining operative connection with said lens assembly, said lens assembly normally restraining shutter opening movement of said lever under influence of said biasing means, said lens assembly being movable out of said bias restraining operative engagement with said lever, said biasing means and said lever being normally operative to open said shutter when said lever is out of said bias restraining operative engagement with said lens assembly.

6. The apparatus of claim 5 including said camera having a second shutter, means normally operably interconnecting said shutters for conjoint operation thereof, means for relatively disconnecting said shutters for independent operation of the first mentioned shutter by said lever, comprising means movable in operative connection with said lever and operable by said lever during shutter opening movement of the latter to disengage at least a portion of said means operably interconnecting said shutters from at least one of said shutters.

7. A camera assembly comprising a shutter having two operating mechanisms, the first shutter operating mechanism including means for operating said shutter, the second shutter operating mechanism including an element movable through said shutter when said shutter is in its open position, the said element having a normal exposure-making position, means on said element movably engaging a portion of said second shutter operating mechanism and preventing operation of said shutter by said second shutter operating mechanism when said element is in said normal exposure-making position, said element being operable to disengage from said portion of said second shutter operating mechanism, said second shutter operating mechanism including means operable to open said shutter when said second shutter mechanism portion is disengaged from said element, for movement of said element through said shutter.

References Cited in the file of this patent

UNITED STATES PATENTS

| | | |
|---|---|---|
| 1,236,419 | Folmer | Aug. 14, 1917 |
| 2,168,893 | Aiken | Aug. 8, 1939 |
| 2,176,679 | Nerwin | Oct. 17, 1939 |
| 2,206,132 | Stewart | July 2, 1940 |
| 2,352,177 | Bolsey | June 27, 1944 |
| 2,529,757 | Baer | Nov. 14, 1950 |
| 2,708,395 | Wagner et al. | May 17, 1955 |